UNITED STATES PATENT OFFICE.

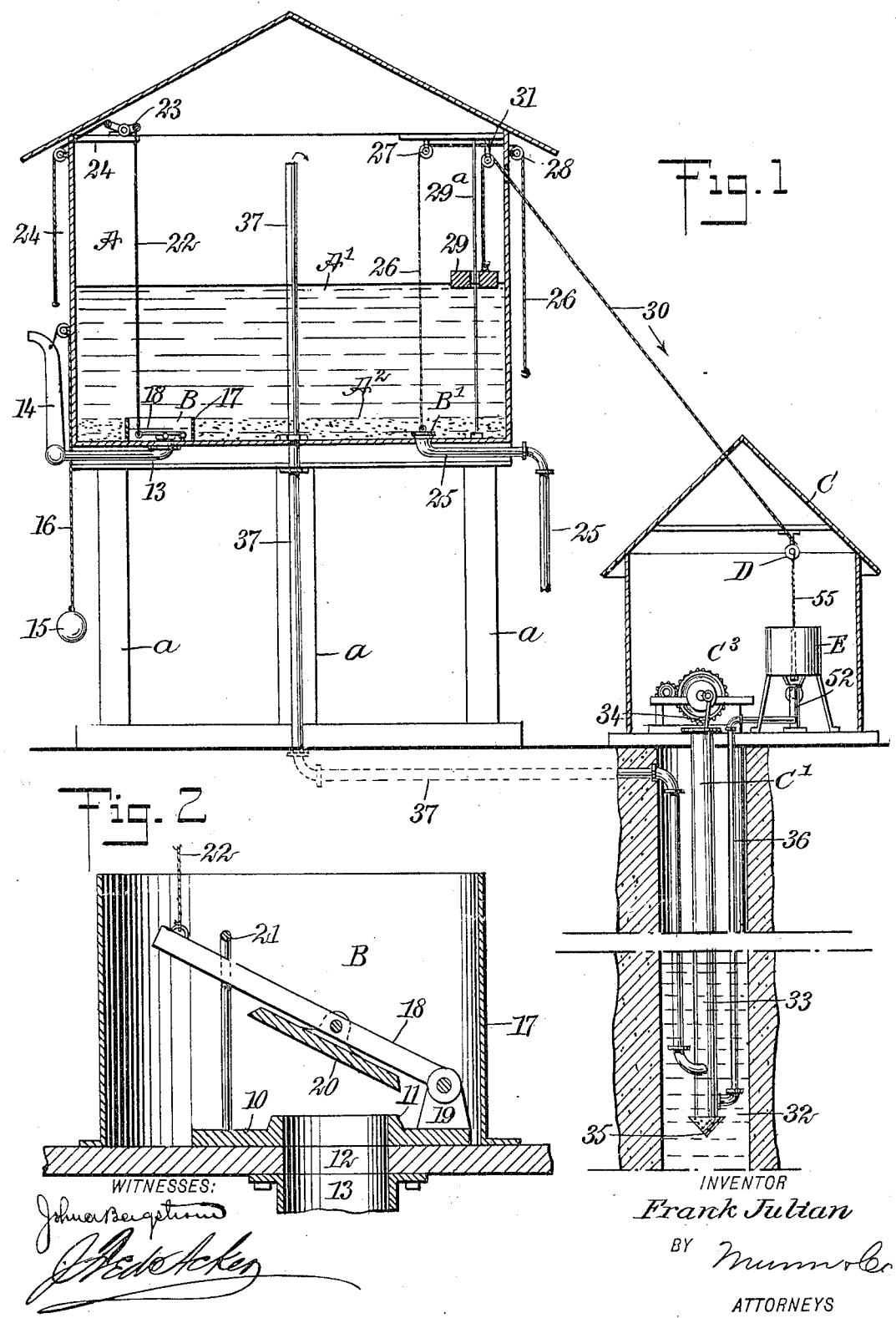

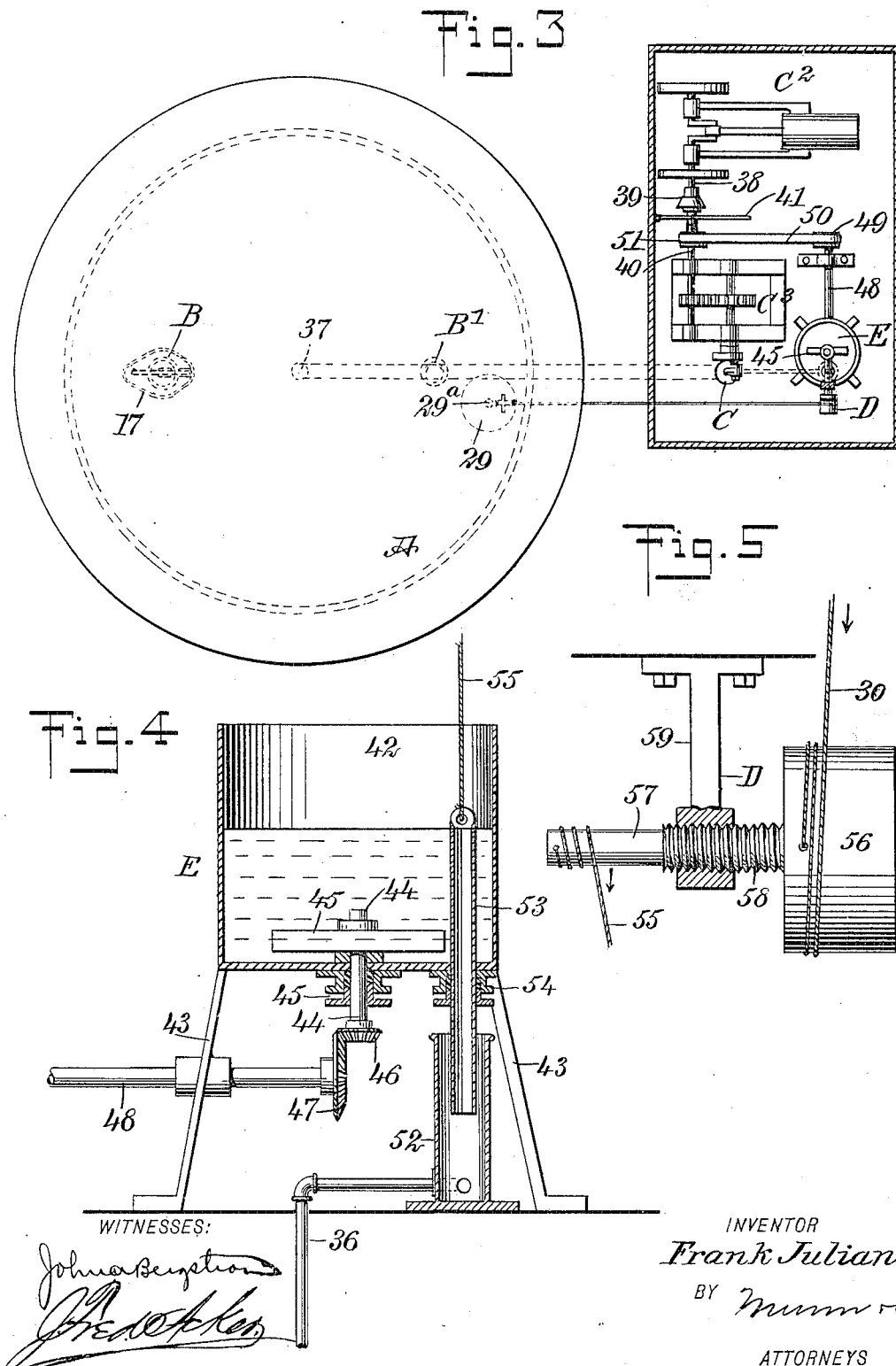

FRANK JULIAN, OF ST. PAUL, MINNESOTA.

APPARATUS FOR PURIFYING NATURAL WATER.

No. 831,873.   Specification of Letters Patent.   Patented Sept. 25, 1906.

Application filed February 26, 1906. Serial No. 302,989.

*To all whom it may concern:*

Be it known that I, FRANK JULIAN, a citizen of the United States, and a resident of St. Paul, in the county of Ramsey and State of Minnesota, have invented a new and Improved Apparatus for Purifying Natural Water, of which the following is a full, clear, and exact description.

The purpose of the invention is to provide a device for purifying natural water that contains compounds of calcium, magnesium, aluminium, iron, and other impurities that by reaction with suitable chemicals can be precipitated in such combinations as are reasonably insoluble in water, or in case the water contains free acid or alkali a neutralizing chemical is used, and wherein to some extent mechanically-suspended matter and certain dissolved objects are carried down with the precipitated impurities.

A further purpose of the invention is to provide devices of simple construction and readily applicable to any water-supply plant to accomplish the above-named results.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the various devices employed and assembled for operation. Fig. 2 is an enlarged vertical section through a portion of the settling and storage tank and the outlet-valve therein, the view being drawn upon an enlarged scale. Fig. 3 is a plan view of the settling and storage tank and a horizontal section through the pump-house used in connection with the said tank, illustrating the pump, the motive power therefor, and the chemical-tank in plan view. Fig. 4 is a vertical section through the chemical-tank, and Fig. 5 is an enlarged sectional side elevation of a portion of a controlling device used in connection with the elements in the settling and storage tank and in the chemical-tank.

The principle is that of mixing with a given volume of impure water a definite proportion of water containing the proper weight for precipitation or neutralization, as the case may be, of suitable chemicals either dissolved or suspended therein. This is accomplished by running a continuous stream of chemical solution into the natural water in the pump-shaft, the volume of the stream being automatically controlled by the rate at which the water passes through the pump. The mixture is conveyed by the pump to the settling-reservoir and the precipitated impurities are allowed to settle. The clear purified water is then drawn off for use as required.

This device is adapted not only for incorporation in water-supply plants under construction, but it may also be readily applied to plants already in operation without any very material changes in their construction or operation. Since such plants differ greatly in design and arrangement of their motor-power, pumps, storage-tanks, &c., there must necessarily be such special modifications and alterations of the device as will readily suggest themselves to one familiar with the subject.

In the form of the device illustrated, A represents a settling and storage tank, from which the purified water A' may be drawn through the medium of the discharge or outlet valve B at the bottom of the tank. As shown, the tank is supported by legs $a$ and is adapted for supplying locomotives, although it may be modified for other purposes, if desired. The outlet-valve B consists of a plate 10, secured to the bottom of the tank, having an opening therein surrounded by a collar 11, which opening in the plate registers with an opening 12 in the bottom of the tank, and the upper end of a pipe 13 is secured to the tank around the opening 12, and said pipe extends beneath the tank at the outer side of the same. In this instance the outlet end of the discharge-pipe 13 has hinged connection with the spout 14, normally held in upper closing position by a weight 15 and connecting-cable 16, as is shown in Fig. 1. A casing 17, open at the top, extends around the plate 10 within the tank, being secured to the latter, and a lever 18 is located within the casing 17, pivoted to a bracket 19 from the plate 10. A closing or cap plate 20 is pivoted to the said lever, which plate 20 is normally seated upon the collar 11 to close communication between the discharge-pipe 13 and the interior of the tank.

The upward movement of the lever 18 is limited by a guide-bail 21, through which it passes, and a cable 22 is attached to the free end of the said lever to lift the same. The said cable 22 is attached to a bell-crank lever 23, mounted at the upper portion of the tank, a second cable 24 being likewise attached to the lever 23, and the latter cable is carried outside of the tank, whereby to open the valve B when desired. The casing 17 is of sufficient height to extend beyond the sludge $A^2$, which forms in the bottom of the tank A, so that nothing but pure water shall escape through the discharge or outlet valve B. A sludge-valve B' is also located in the bottom of the tank A, which latter valve may be of the same construction as the valve B, with the exception of the casing 17, or it may be of any desired construction. A pipe 25 is connected with and is led from the valve B' to any desired spot away from the tank, through which pipe 25 the precipitated sludge is periodically flushed out. The valve B' closes by gravity, but is opened by pulling upon a cable 26, which leads to the outside of the tank, being passed over pulleys 27 and 28 at the top of the same. A float 29 rests upon the surface of the water A', being adapted to freely rise and fall upon a guide-rod $29^a$.

A cable 30 is attached to the float, and said cable runs over a pulley 31 at the upper portion of the tank and into the adjacent pump-house C for attachment to a controlling device in a manner to be hereinafter described. In the pump-house are located the pump C' and its motive power, which, as shown, comprises a gasolene-engine $C^2$ and pump-jack $C^3$, although any other of the commonly used machines may be substituted, such as a steam-engine and piston-pump, a windmill and plunger-pump, &c.

A well 32 is located beneath the floor of the pump-house C or adjacent to it, and the pump C' shown consists of a cylinder 33 and piston and piston-rod 34, the cylinder being provided with a strainer 35 at its lower end. Just above the strainer 35 and below the suction-valve of the pump-shaft the lower end of a chemical-supply pipe 36 is connected with the pump, as is shown in Fig. 1, the other end of which pipe 36 is connected with a chemical-tank E, also preferably located in the pump-house C and which will be hereinafter described.

From the outlet of the chemical-supply pipe 36 the mixture of water and chemicals employed is passed through the pump C' and into a delivery-pipe 37, connected with the pump at a point above the chemical-supply pipe 36, which delivery-pipe 37 conducts the water chemically purified into the tank, preferably at a point near its center. The top of the water-supply pipe 37 is open and is near the top of the tank, as shown in Fig. 1, or at any point above the sludge $A^2$.

The drive-shaft of the engine $C^2$ is provided with a clutch 39, which is adapted to engage with the drive-shaft 40 of the pump-jack $C^3$, as shown in Fig. 3, the clutch being operated by a suitable lever 41. The construction of the chemical-tank E is best shown in Fig. 4. It consists of a wooden or a metal, preferably cylindrical, receptacle 42 open at the top and is adapted to hold the chemicals and the water which are to be used, the said receptacle being usually supported by legs 43. A shaft 44 extends up through the bottom of the receptacle far enough to accommodate agitating or stirring arms 45, one or more of which may be employed, the said arms extending beyond opposite sides of the shaft and are located near the bottom of the receptacle. The stirring devices are needed only where the purifying chemicals are insoluble in the water contained in the receptacle 42 and tend to settle at the bottom.

The shaft 44 is made to turn in a stuffing-box 45, attached to the bottom of the tank, and the said shaft is provided with a bevel-pinion 46, meshing with a gear 47 on a line-shaft 48, which carries a pulley 49, as shown in Fig. 3, connected by a belt 50 with a pulley 51 on the drive or other shaft of the pump-jack; but I do not limit myself to the exact means shown for driving the shaft 44, as any other means may be employed capable of turning the said shaft at a moderate speed. Instead of driving said shaft 44 from the pump-jack the motive power of the pump may be employed for that purpose, or a separate motor may be used.

With reference to the feed mechanism from the chemical-tank E, it consists of a receptacle 52, suitably supported beneath the body-receptacle 42 of the tank, and the receiving-receptacle 52 is connected with the chemical-discharge pipe 36 and is open at the top to receive the lower end portion of a tube 53, which is located partly within the body-receptacle 42 of the tank and the receiving-receptacle 52 and is adapted for end movement. This tube 53 is open at the top and at the bottom.

The movement of the feed-tube 53 relatively to the body-receptacle 42 and the receiving-receptacle 52 is governed by the movement of the float 29 in the tank A through the medium of the controlling mechanism heretofore mentioned, and it is illustrated particularly in Fig. 5. This controlling mechanism D consists of a large-sized cylinder 56, having a stem 57 extending centrally from end to end, the stem 57 being of much less diameter than the diameter of the cylinder 56, and the stem is threaded at that portion 58 which is adjacent to the cylinder 56, and the threaded portion of the stem 57 turns in a threaded aperture in a hanger 59, suitably secured to an overhead support in the pump-house, as is shown in Fig. 1.

The cable 30 from the float 29 is attached to and is wound around the cylinder 56, and a cable 55 is carried from the upper end of the feed-tube 53 and is attached to and wound around the stem 57 of the cylinder 56 in a direction the reverse of the winding of the cable 30, and the threads 38 serve as guides for the cylinder and connected stem in their rotation and likewise prevent the cables from possibly overlapping on the parts of the device to which they are secured.

The tube 53 is usually made of brass and is quite heavy and moves downward by gravity, and through the medium of the controlling device D as the float 29 moves upward the cable 55 unwinds, causing the cable 30 to wind up and the feed-tube 53 to descend and permit the chemical solution in the tank E to feed through the tube 53 to the pump C in the manner which has been described. As the float 29 moves downward the cable 55 is wound up, drawing the tube 53 with it, and the cable 30 is unwound. Thus, for example, the tank E being full of the chemical solution and the tube 53 at its highest elevation and the tank A being comparatively empty, as the tube is permitted to lower by pumping water into the tank A the solution from the tank E enters the pump through the elements 36, 52, and 53 and purifies the water as it is fed to said tank A. In fact, the fall of the tube 53 is proportionate to the volume of water entering the tank A. The diameter of the parts 56 and 57 of the controlling device is in proportion to the heights of the water-space in the storage-tank A and the chemical-tank E.

In the operation of my device, assuming both tanks to be empty, a suitable amount of chemical solution for treating a tank full of water is placed in the tank E. At this stage of the operation the float 29 will be at the bottom of the tank A, and the pipe 53 would be drawn upward to its highest position, thus shutting off the feed of the chemical in the tank E to the pumping device. When the pumping device is started and the water commences to flow into the tank A, the float 29 rises and the pipe 53 is lowered in the tank E so that a part of the solution in the said tank may flow outward through the pipe into the water passing through the pumping device. It is obvious that as the water rises in the tank A the chemical solution will fall in the tank E, and since the controlling mechanism for the pipe is calculated for the relation of the tanks to each other the flow of chemical from the tank E will be in direct proportion to the flow of water into the tank A. Should the pumping device throw an increased amount of water into the tank A, the float 29 will rise proportionately faster and will permit a larger amount of chemical solution to flow out of the tank E, and conversely.

Having thus described my invention, I claim as new and desire to secure by Letters Patent—

1. In an apparatus for purifying water, a tank for containing a chemical solution, a receiver outside of the tank and communicating with the liquid to be purified, a feed-tube open at both ends and mounted to slide in the tank and in the receiver, and means controlled by the water to be purified for lowering the tube in the receiver, whereby to gradually feed the contents of the tank to the liquid to be purified.

2. In an apparatus for purifying water, a tank adapted to contain a chemical solution, a receiver outside of the said tank and adapted for communication with the liquid to be purified, a feed-tube open at both ends and mounted to slide in the tank and in the receiver, and means controlled by the water to be purified for lowering the tube whereby to regulate the feed.

3. In an apparatus for purifying water, a tank adapted to contain a chemical solution, a receiver beneath the said tank, devices for connecting the said receiver with a source of water-supply to be purified, a feed-tube having open ends mounted to slide in the said tank and in the receiver, stirrers mounted to revolve in the tank, a driving mechanism for the stirrers, and means controlled by the water to be purified for lowering the feed-tube whereby to control the feed.

4. In an apparatus for purifying water, a storage and settling tank, a tank independent of the storage and settling tank, adapted to contain a chemical solution, a receiver below the chemical-tank, a pump, a connection between the pump and the receiver, a water-supply pipe leading from the pump and extending within the settling and storage tank, an automatic feed-valve operating partly within the chemical-tank and partly within the receiver, and means whereby the rise of the water in the settling and storage tank will operate said valve.

5. In an apparatus for purifying water, a storage-tank, devices for drawing water therefrom, a second tank adapted to contain a chemical liquid, a receiver below the said chemical-liquid tank and adapted for communication with the receiver, connections between the receiver and the source of water-supply and the said storage-tank, a float located in the storage-tank, and connections whereby to automatically operate the valve in the chemical-tank by the rise of the float.

6. In an apparatus for purifying water, a storage-tank, devices for drawing water therefrom, a second tank adapted to contain a chemical, a receiver below the said chemical-tank and communicating with the tank, a feed-valve between the tank and the receiver, connections between the receiver and the source of water-supply, connections between the source of supply and the said storage-tank, a controlling mechanism located between the two tanks, and connections between the float and the controlling mechanism and the controlling mechanism and the valve, whereby to automatically operate the said valve by the rise of the said float.

7. In an apparatus for purifying water, the combination with a storage-tank, means for drawing water and for drawing sludge therefrom, a float located in the storage-tank, a second tank adapted to contain a chemical liquid, a receiver below said chemical-tank, and a tubular valve open at its ends and having sliding movement in the chemical-tank and in the receiver, connections between said receiver and the source of water-supply, and connections between said source of water-supply and the interior of the storage-tank, of a feed-controlling device comprising a cylinder and a stem therefrom of less diameter than the cylinder, a flexible connection between the stem and the said valve, and a flexible connection between the cylinder of the controlling device and the said float, the connections being attached to the stem and the cylinder and passed around the stem and cylinder in opposite directions, whereby the valve is controlled by the rise of the float.

In testimony whereof I have signed my name to this specification in the presence of two subscribing witnesses.

FRANK JULIAN.

Witnesses:
L. PETERSEN,
J. LEONARD.